United States Patent [19]
Judd et al.

[11] 3,980,397
[45] Sept. 14, 1976

[54] DIFFRACTION SMOOTHING APERTURE FOR AN OPTICAL BEAM

[75] Inventors: O'Dean P. Judd; Bergen R. Suydam, both of Los Alamos, N. Mex.

[73] Assignee: The United States of America as represented by the United States Energy Research and Development Administration, Washington, D.C.

[22] Filed: May 9, 1975

[21] Appl. No.: 576,532

Related U.S. Application Data

[63] Continuation of Ser. No. 398,267, Sept. 17, 1973, abandoned.

[52] U.S. Cl. ................. 350/162 R; 331/94.5 T
[51] Int. Cl.² ............................. G02B 5/18
[58] Field of Search .......... 350/162 R, 162 SF, 314, 350/319, 205, 206; 355/125, 126, 2, 133; 354/296; 331/94.5 T

[56] References Cited
UNITED STATES PATENTS
3,426,293   2/1969   Snitzer .................. 350/206

Primary Examiner—John K. Corbin
Assistant Examiner—Jon W. Henry
Attorney, Agent, or Firm—Dean E. Carlson; Robert W. Weig; Jerome B. Rockwood

[57] ABSTRACT

The disclosure is directed to an aperture for an optical beam having an irregular periphery or having perturbations imposed upon the periphery to decrease the diffraction effect caused by the beam passing through the aperture. Such apertures are particularly useful with high power solid state laser systems in that they minimize the problem of self-focusing which frequently destroys expensive components in such systems.

1 Claim, 7 Drawing Figures

DIFFRACTION SMOOTHING APERTURE FOR AN OPTICAL BEAM

The invention described herein was made in the course of, or under, a contract with the U.S. Atomic Energy Commission.

This is a continuation of application Ser. No. 398,267, filed Sept. 17, 1973 now abandoned.

FIELD OF THE INVENTION

The invention relates to apertures for optical beams and more particularly to apertures for smoothing diffraction effects on beams passing therethrough.

BACKGROUND OF THE INVENTION

A common device used to define the radial spatial extent of an optical beam, or other form of electromagnetic wave, is to shear a portion of the beam with a circular aperture. The beam emerging from the aperture is defined spatially, but, as the distance from the aperture increases, large intensity variations occur across the width of the beam. The diffraction effect produced on the beam as it passes through the circular aperture causes these intensity variations. A particular example of this effect occurs with a uniformly illuminated circular aperture. After the beam passes through the circular aperture, a peak intensity arises at the center of the beam, and the intensity surrounding the center decreases. This intensity peak may be as much as a factor of four larger than the average intensity of the remainder of the beam.

In many commercial and scientific applications, one desires to obtain an optical beam such as a laser beam, in which spatial variations such as this intensity peak are minimized or absent. Such a requirement is particularly pertinent in high power solid state laser systems wherein self-focusing can destroy the lasing device.

SUMMARY OF THE INVENTION

In accordance with the present invention there is provided an aperture adapted for use with optical beams and in particular, laser beams, for smoothing diffraction caused central and other intensity variations in such beams passing therethrough. The aperture of the invention, being substantially circular, has a plurality of selectively distributed perturbations about its periphery. The perturbations are small in comparison to the diameter of said aperture, and affect the beam passing therethrough so as to suppress diffraction caused intensity variations, particularly the central intensity peak. The perturbations may be periodic or non-periodic, irregularly or regularly shaped, and random or non-random in size.

One object of the present invention is to eliminate or minimize destruction caused by self-focusing in solid state lasers.

Another object of the present invention is to provide optical beams having predetermined desirable intensity profiles across their width.

One advantage of the present invention is that in accordance therewith, the intensity profile of optical beams can be controlled or maintained in accordance with predetermined criteria.

Another advantage of the present invention is that the aperture provided in accordance therewith inexpensively and efficiently deters self-focusing in laser mediums.

Other objects and advantages of the present invention will be apparent to those skilled in the art from the following disclosure with reference to the appended drawings wherein:

FIG. 1 shows a circular aperture in a mask located in front of a light source;

FIGS. 2A, 2B, and 2C show intensity patterns in the cross section of a beam passing through the aperture of FIG. 1 at planes A, B, and C;

DETAILED DESCRIPTION OF THE INVENTION

Figure 1:
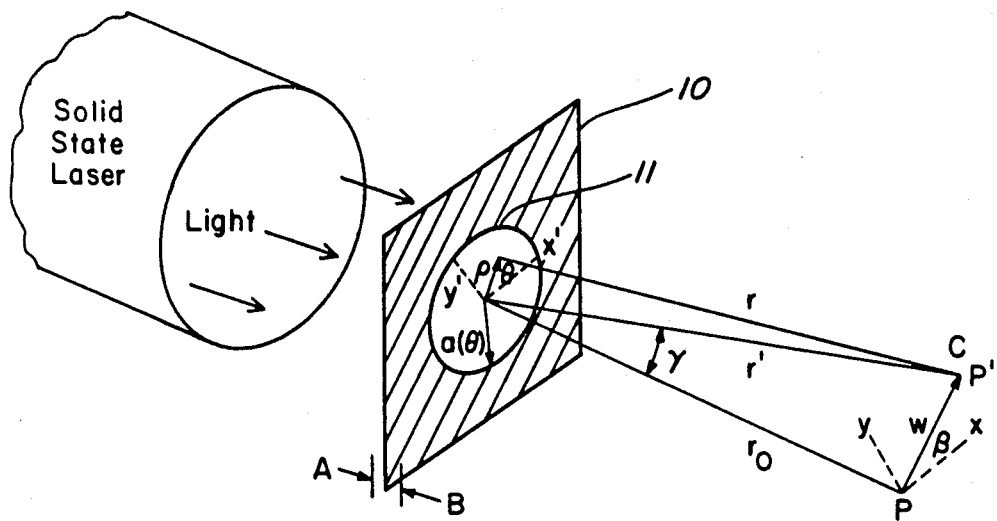

As can be seen in FIG. 1, a mask 10 defines an aperture 11 having a radius of $a$. Point A defines a plane A immediately "in front of" and parallel to the plane of aperture 11, i.e., between the light source and aperture 11. Point B defines a plane B immediately "behind" and parallel to the plane of aperture 11. Point C defines a plane C a distance $r_0$ downstream from the aperture 11 and parallel to the plane of aperture 11. Typically at point C, $$r_0 = \frac{a^2}{30\lambda},$$

where $\lambda$ is the wavelength of the light in the beam.

Figure 2:
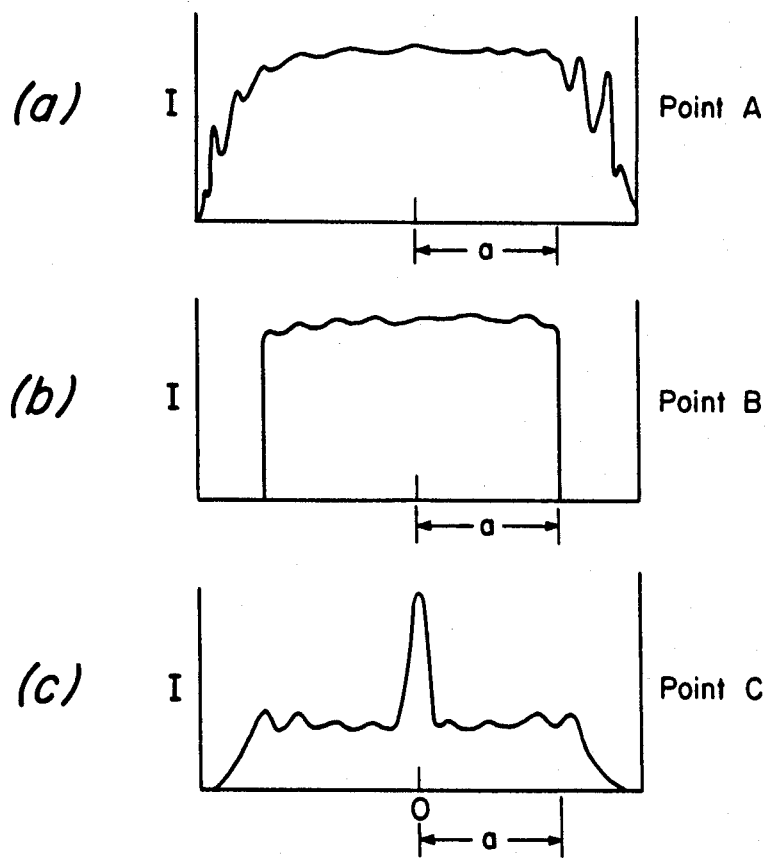

Reference is now made to FIGS. 2A, 2B, and 2C. FIG. 2A shows a profile of the beam originally having a cross section of substantially uniform illumination at plane A; FIG. 2B shows the beam at plane B and the effect the aperture has on its intensity profile; and FIG. 2C shows the intensity profile of the beam at plane C, a distance of $r_0$ from the aperture. The amount of intensity peak present depends on the distance past the aperture of the light beam.

In accordance with the invention, one may smooth central intensity peaks of a circular aperture by including perturbations within the circular aperture's periphery but maintaining its average circularity. For a uniformly illuminated aperture, any periodic perturbation about the periphery of the circular aperture having an average radius of $a$ and a peak amplitude of $\epsilon$ causes a decrease in the central intensity peak proportional to the factor $N\epsilon$.

The Fresnel number N is defined as $$N = a^2/\lambda r_0$$

where $a$ is the radius of the aperture, $\lambda$ is the wavelength of the light passing therethrough and $r_0$ is the distance down the beam past the aperture. Too, if $m$ equi-amplitude periodic perturbations are superimposed on the periphery of the aperture, the intensity peak is reduced by a factor $\epsilon^m$. Physically, this statement means that the more irregular the periphery of the aperture the more smoothing influence on the central intensity peak of the beams passing therethrough.

Figure 3:
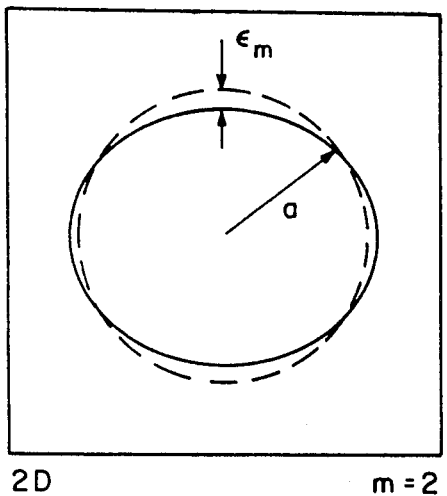
FIG. 3 shows an aperture in accordance with the invention.
Figure 5:
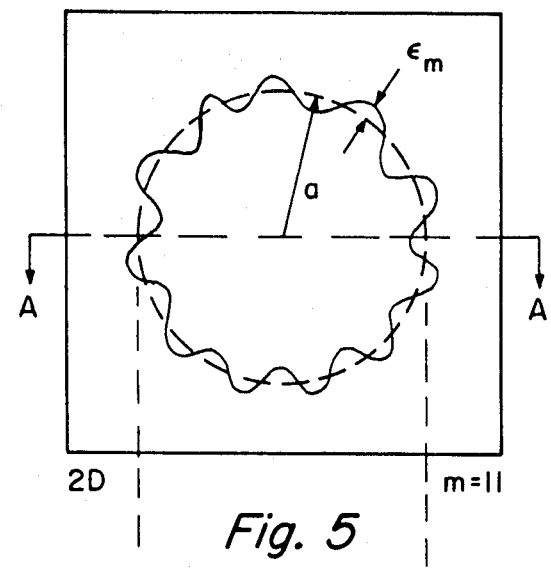
FIG. 5 shows still another aperture in accordance with the invention.
Figure 4:
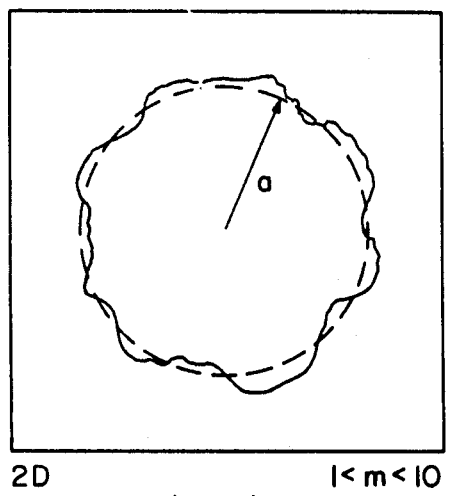
FIG. 4 shows another aperture in accordance with the invention.
Figure 6:
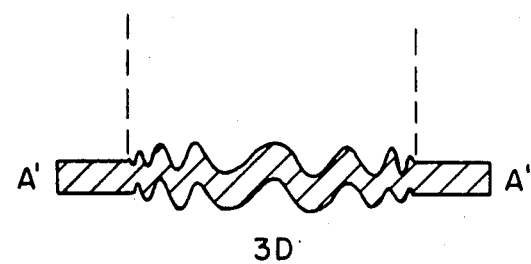
FIG. 6 shows a cross sectional view of the mask for the aperture of FIG. 5.

FIG. 3 shows a 2 dimensional view of an aperture where $m = 2$ and FIG. 4 shows a 2 dimensional view of an aperture having irregular perturbations where $m$ may be between 1 and 10. FIG. 5 shows a 2 dimensional view of an aperture having an $m$ of 11, i.e. 11 full periodic cycles. FIG. 6 shows the cross-sectional profile of the FIG. 5 aperture through a cutaway section A.

One may mathematically derive a quantitative analytical estimate of the central and peak intensities as a function of aperture irregularity. The problem has been approached by the inventors in terms of the Kirchoff integral formulation of diffraction theory rather than a solution of the paraxial wave equation. This is because analytic expressions appeared to be more conveniently derivable with the former method.

In these calculations the usual approximations and assumptions of scaler versus vector diffraction theory are adopted, i.e., the aperture radius $a$ is much larger than the wavelength of the light and the distance from the aperture $r_0$ is sufficiently large that $a^2/r_0^2 << 1$. Because these conditions are adequately satisfied for most practical applications, the Kirchoff integral formulation appears to be a useful method for treating the problem.

By way of example and not limitation, we will deal herein with on-axis intensity calculations for (1) a uniformly illuminated aperture and (2) a Gaussian illumination of an aperture. In accordance with the invention, the theory can be extended to include finite curvature and spatial beam divergence of the illumination source. The invention may also be applied to tapered apertures which include both phase and amplitude effecting embodiments.

Figure 7:
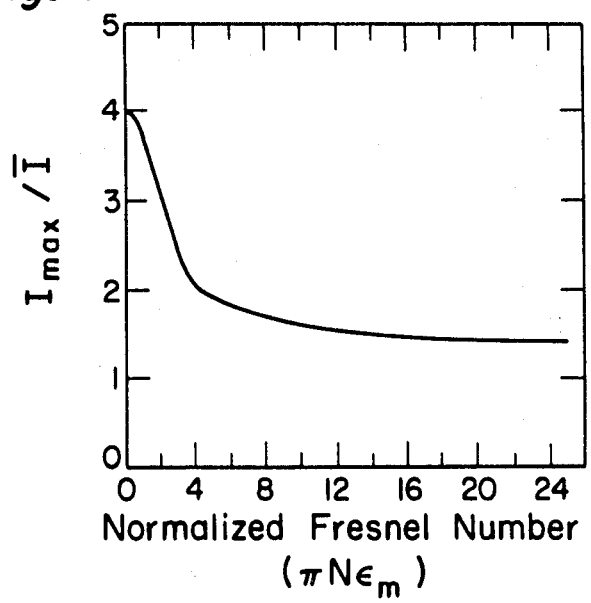

The results of this analysis are partially summarized in FIG. 7 which indicates that a significant smoothing of the on-axis intensity peak is obtainable for $N \geq 20$ if perturbations are introduced on the periphery of the aperture having an amplitude on the order of about $0.1 a$. The greater the degree of irregularity of the perturbations, the greater the degree of smoothing achievable. It will be appreciated by those skilled in the art that irregular apertures in accordance with the invention can be easily fabricated and represent a simple device for reducing spatial variations in intensity introduced by diffraction effects on optical beams passing through apertures.

Diffraction Theory with the Kirchoff Integral Formulation

Referring to FIG. 1 for an arbitrary aperture with an intensity distribution $F(\rho, \theta)$, the intensity at the observation point $P'$ with polar coordinates $w$ and $\beta$ is obtained by summing the contributions from each point $\rho$ and $\theta$ in the aperture. The electric field at $P'$ is $$E \propto \int \int F(\rho, \theta) e^{ikr' \rho \cdot \theta} \rho d\rho d\theta \tag{1}$$

The geometry of the problem gives $$r^2 = (x-x')^2 + (y-y')^2 + r_0^2 \tag{2}$$

$$r'^2 = x'^2 + y'^2 + r_0^2 \tag{3}$$

where $r_0$ is the perpendicular distance from the plane of the aperture to the plane of observation. From FIG. 1 and Equations (2) and (3), one obtains $$r = r' \left[ 1 + \frac{\rho^2}{r'^2} - 2\mu \frac{w \cos(\theta + \beta)}{r'} \right]^{1/2} \tag{4}$$

We now assume that $\rho^2/r'^2$ and $\rho w/r'^2$ are $<< 1$ so that Equation (4) becomes $$r = r' + \rho^2/2r_0 \cos \gamma - \rho \sin \gamma \cos(\theta + \beta) \tag{5}$$

where we have used the relation that $r_0 = r' \cos \gamma$ and $w = r' \sin \gamma$.

The point of observation is specified completely by the angles $\gamma$ and $\beta$. For axial symmetry, only $\gamma$ needs to be specified.

The field as given by Equation (1) can now be written in the form $$E \propto \frac{e^{ikr'}}{r'} \int \int F(\rho, \theta) e^{if} \rho \cdot \theta \,\rho d\rho d\theta \tag{6}$$

where $$f(\rho, \theta) = \frac{k\rho^2}{2r_0} \cos \gamma - k\rho \sin \gamma \cos(\theta + \beta) \tag{7}$$

Equations (6) and (7) are the working equations of this section and are well known to those skilled in the art. We initially assume uniform illumination of the aperture so that $F(\rho\theta)$ is unity. For convenience, we will also drop the propagation factor $e^{ikr'}/r'$ and reinsert it when needed.

Using the Bessel function identity $$e^{i\Gamma \sin \theta} = \sum_n J_n(\Gamma) e^{in\theta} \tag{8}$$

Equations (6) and (7) can also be written in the form $$E \propto \sum_n \int_0^{2\pi} \int_0^a e^{i[k\rho^2/2r_0]\cos \gamma} J_n(k\rho \sin \gamma) e^{in\theta} \rho d\rho d\theta \tag{9}$$

Fraunhofer Diffraction

In order to check the validity of Equation (9), we look for the solution in the far field region for uniformly illuminated circular aperture. The integral over $\theta$ can be performed immediately with a resulting contraction of the sum over Bessel functions to the single term $n=0$. In the limit that $r_0 \to \infty$ one is left with the integral $$E \propto \int_0^a J_0(k\rho \sin \gamma) \rho d\rho \tag{10}$$

Using the relation that $$\frac{d}{dx}[x^{n+1}J_{n+1}(x)] = x^{n+1}J_n(x) \tag{11}$$

one obtains, after dropping some constants, $$E \propto 2 \frac{J_1(k\alpha \sin \gamma)}{k\alpha \sin \gamma}$$

The intensity, defined as $|E|^2$ is given as $$I = I_0 4 \left[ \frac{J_1(ka \sin \gamma)}{ka \sin \gamma} \right]^2 \quad (12)$$

where $I_0$ is the on-axis intensity ($\gamma=0$). This is the Airy pattern in the far field.

Fresnel Diffraction

The diffraction pattern is now considered for a finite $r_0$. General evaluating Equation (9), we discuss the intensity on the axis $r_0$. In this case $\gamma=0$ and the only Bessel function that remains is $n=0$. At this point, we remove the assumption that the radius of the aperture is a constant and consider it a function of $\theta$. Under these conditions, Equation (9) may be written in the form $$E \propto \int_0^{2\pi} d\theta \int_0^{\frac{ka^2(\theta)}{2r_0}} e^{ix} dx \quad (13)$$

$$\propto \int_0^{2\pi} [e^{i \, ka^2(\theta)/2r_0} - 1] d\theta. \quad (14)$$

Non Symmetric Apertures

We now assume an arbitrary perturbation on the radius of the aperture. The perturbation can be decomposed into $m$ components in the general Fourier form $$a(\theta) = a [1 + \sum_m \epsilon_m \sin m\theta] \quad (15)$$

where $a$ is the average radius of the aperture and $\epsilon_m$ is the $m^{th}$ fractional amplitude component of the perturbation. Defining the Fresnel number of the aperture as $$N = a^2/\lambda r_0$$

Equation (14) may be written in the form $$E \propto \int_0^{2\pi} [e^{i \pi N(1 + \sum \epsilon_m \sin m\theta)^2} - 1] d\theta. \quad (16)$$

We now assume that all $\epsilon_m < 1$ and expand the bracket in the exponent. Using the Bessel function identity in Equation (8), we obtain $$E \propto \int_0^{2\pi} [e^{i\pi N} \sum_n \prod_m J_n(2\pi N \epsilon_m) e^{inm\theta} - 1] d\theta \quad (17)$$

where the product is taken over all Fourier components. Performing the integration results in the electric field being given by $$E \propto [e^{i\pi N} \prod_m J_0(2\pi N \epsilon_m) - 1]. \quad (18)$$

Reinserting the appropriate constants and defining $\bar{I}$ to be the average beam intensity across the aperture, the intensity on axis is given by $$I = \bar{I} [(\prod_m J_0(2\pi N \epsilon_m))^2 + 1 - 2 \prod_m J_0(2\pi N \epsilon) \cos N\pi] \quad (19)$$

which is the desired result.

In the case of a perfectly circular aperture, $\epsilon_m \to 0$, Equation (19) becomes $$I = 4\bar{I} \sin^2 \frac{N\pi}{2} \quad (20)$$

Equation (20) yields the familiar result that the intensity along the axis in the Fresnel region of diffraction exhibits maxima and minima at odd and even Fresnel numbers respectively. This is the characteristic behavior of the central diffraction peak resulting from a uniformly illuminated circular aperture.

In order to investigate the effects of a non-circular aperture, we assume $2\pi N\epsilon << 1$. Using the asymptotic form for $J_0(x)$, Equation (19) becomes $$I = \bar{I} \{1 - \prod_m \sqrt{\frac{4}{\pi N \epsilon_m}} \cos(2\pi N\epsilon_m - \pi/4) \cos N\pi \}. \quad (21)$$

One observes in Equation (21) that as $\pi N \epsilon_m \to \infty$, the oscillatory behavior of the on-axis intensity vanishes. From the standpoint of self-focusing, one wants to minimize any peaks in the intensity above the average. For perfect circular symmetry, Equation (2) indicates that this peak value can be four times the average value. In accordance with the invention, the presence of irregularities in the aperture reduces this factor. The amount of reduction, resulting from any one fourier component can be estimated from FIG. 7 where we have plotted the value of $I_{max}/\bar{I}$ versus normalized Fresnel number $\pi N \epsilon_m$.

FIG. 7 clearly shows a significant reduction in the intensity variation can be achieved with an irregularity of an amount $\epsilon_m = 10/\pi N \approx 3/N$. At a Fresnel number of 20, this amounts to a variation in radius of 15 percent, a value easily achieved in practice. In order to reduce the variation of intensity from 66 percent to 20 percent, one increases $\pi N \epsilon_m$ by an order of magnitude. Since the effect of many finite amplitude Fourier components on the oscillatory behavior of the intensity enters as a product of reduction factors, it is clear that the more irregular the perturbation, the more the oscillatory intensity behavior is diminished. Every Fourier component of the irregularity provides the same reduction factor.

The oscillatory variation of the on-axis intensity is largest for a uniformly illuminated aperture. We now consider the case of non-uniform aperture illumination

Gaussian Illumination

For this case, we assume the source distribution to be of the form $$F(\rho,\theta) = e^{-\frac{\rho^2}{b^2}} \quad (22)$$

where $b$ is the measure of the diameter of the gaussian beam.

Inserting this form into Equation (9) yields the previous results with $N$, replaced by $$N \rightarrow N + \frac{i}{\pi} \frac{a^2}{b^2} \quad (23)$$

In the limit of the circular aperture, Equation (20) becomes $$I \propto \left\{ |1 - e^{-a^2/b^2}|^2 + 4e^{-a^2/b^2} \sin^2 \frac{N\pi}{2} \right\} \quad (24)$$

As $a^2/b^2 \rightarrow 0$, the uniform illumination result is recovered. In the opposite limit, $a^2/b^2 \rightarrow \infty$, the beam fails to "see" the aperture and the dependence on $N$ vanishes.

The limit of a noncircular aperture is obtained by the substitution $$J_n(x) \rightarrow e^{a^2/b^2} J_n(x) \quad (25)$$

in Equations (19) and (21). The result is that the value of $\pi N\epsilon$ is replaced by $$\pi N\epsilon \rightarrow \pi N\epsilon \, e^{2a^2/b^2} \quad (26)$$

in the previously derived expressions.

The various features and advantages of the invention are thought to be clear from the foregoing description. However, various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

We claim:

1. In combination with a solid state laser, an opaque sheet having an aperture therein, the aperture being substantially circular and having a periphery, the radius of said periphery varying randomly to provide irregular perturbations of said periphery, the maximum attained radial extent of said perturbations being substantially 10 per cent of the average radius of said aperture, means for passing a beam from said laser through said aperture, the diameter of said beam being at least as great as the average diameter of said aperture whereby the diffraction caused central intensity peak in said beam is smoothed.

* * * * *